(12) United States Patent
Eguchi

(10) Patent No.: US 10,221,275 B2
(45) Date of Patent: Mar. 5, 2019

(54) FURAN RESIN, METHOD FOR PRODUCING SAME, THERMOSETTING FURAN RESIN COMPOSITION, CURED PRODUCT, AND FURAN RESIN COMPOSITE

(71) Applicant: SEKISUI CHEMICAL CO., LTD., Osaka (JP)

(72) Inventor: Yuji Eguchi, Tsukuba (JP)

(73) Assignee: SEKISUI CHEMICAL CO., LTD., Osaka (JP)

(*) Notice: Subject to any disclaimer, the term of this patent is extended or adjusted under 35 U.S.C. 154(b) by 206 days.

(21) Appl. No.: 15/506,485

(22) PCT Filed: Aug. 28, 2015

(86) PCT No.: PCT/JP2015/074524
§ 371 (c)(1),
(2) Date: Feb. 24, 2017

(87) PCT Pub. No.: WO2016/031988
PCT Pub. Date: Mar. 3, 2016

(65) Prior Publication Data
US 2017/0253686 A1 Sep. 7, 2017

(30) Foreign Application Priority Data

Aug. 29, 2014 (JP) ................... 2014-176407
Aug. 29, 2014 (JP) ................... 2014-176422

(51) Int. Cl.
C08L 61/00 (2006.01)
C08G 16/02 (2006.01)
C08J 5/04 (2006.01)

(52) U.S. Cl.
CPC ..... C08G 16/0256 (2013.01); C08G 16/0262 (2013.01); C08J 5/043 (2013.01); C08L 61/00 (2013.01); *C08J 2361/00* (2013.01)

(58) Field of Classification Search
CPC ................. C08L 61/26; C08L 61/00
See application file for complete search history.

(56) References Cited

U.S. PATENT DOCUMENTS

| | | | |
|---|---|---|---|
| 2,363,829 A | 11/1944 | Caplan et al. | |
| 2,600,403 A | 6/1952 | Harvey | |
| 2,655,491 A * | 10/1953 | Edmunds | C08K 5/42 524/612 |
| 2,828,275 A | 3/1958 | Harvey | |
| 4,657,593 A | 4/1987 | Aignesberger et al. | |
| 5,459,183 A * | 10/1995 | Taylor | C08G 16/025 524/100 |
| 9,527,952 B1 * | 12/2016 | Sucheck | C08G 63/16 |
| 9,840,485 B1 * | 12/2017 | Eguchi | C07D 307/36 |
| 2012/0209013 A1 * | 8/2012 | Bendikov | C07D 307/34 549/472 |
| 2013/0019982 A1 * | 1/2013 | Kobayashi | B29C 63/36 138/97 |

FOREIGN PATENT DOCUMENTS

| | | | |
|---|---|---|---|
| CN | 102821932 | 12/2012 | |
| CN | 102850157 | 1/2013 | |
| CS | 227 107 | 4/1984 | |
| CS | 230 690 | 8/1984 | |
| JP | 58-87111 | 5/1983 | |
| JP | 2013-234286 | 11/2013 | |
| JP | 2013-234286 A * | 11/2013 | ............. C08L 61/02 |
| WO | WO 2015/199481 A1 * | 12/2015 | ............. C08G 16/02 |

OTHER PUBLICATIONS

Wang, L.; Eguchi, Y.; Chen, E. Y.-X. Ind. Eng. Chem. Res. 2017, 56, 11380-11387 (Year: 2017).*
International Search Report dated Nov. 17, 2015 in International (PCT) Application No. PCT/JP2015/074524.
Kliem Alexander et al., "The Partial Hydrogenation of Difurfuralacetone and Related Compounds", Journal of American Chemical Society, vol. 72, No. 12, 1950, pp. 5506-5507.

* cited by examiner

*Primary Examiner* — Rip A Lee
(74) *Attorney, Agent, or Firm* — Wenderoth, Lind & Ponack, L.L.P.

(57) ABSTRACT

Provided are [1] a furan resin comprising a repeating unit represented by the following general formula (1); and [2] a method for producing a furan resin, comprising reacting a specific furan compound and a specific carbonyl compound in the presence of an acid catalyst:

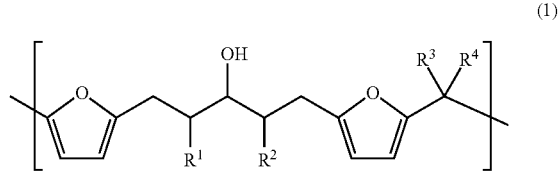

(1)

wherein $R^1$, $R^2$, $R^3$ and $R^4$ each independently represent a hydrogen atom, or an organic group having 1 to 8 carbon atoms which may contain a hetero atom; and $R^1$ and $R^2$, and $R^3$ and $R^4$ may be connected to each other to form a cyclic structure.

10 Claims, 5 Drawing Sheets

FURAN RESIN, METHOD FOR PRODUCING SAME, THERMOSETTING FURAN RESIN COMPOSITION, CURED PRODUCT, AND FURAN RESIN COMPOSITE

TECHNICAL FIELD

The present invention relates to a furan resin, a method for producing the same, a thermosetting furan resin composition, a cured product, and a furan resin composite.

BACKGROUND ART

A thermosetting furan resin composition which contains a furan resin composed of a co-condensation product of furfuryl alcohol and formaldehyde can make a cured product excellent in heat resistance, solvent resistance, and chemical resistance, and is conventionally used as steel pipe lining, joint cement, and a matrix resin for a laminate or composite material such as FRP or the like, in various industrial fields.

As such a thermosetting furan resin composition, PTL1 discloses a thermosetting furan resin composition which contains a furan resin obtained from a reaction of furan or a furan derivative and an aldehyde in the presence of an acid catalyst.

CITATION LIST

Patent Literature

PTL1: JP 2013-234286 A

SUMMARY OF INVENTION

Technical Problem

Since the thermosetting furan resin composition for use in the above application needs to make a cured product excellent in elongation percentage while maintaining the strength etc., and excellent in adhesion to glass fiber etc., the further improvement in these properties has been desired.

The present invention provides a furan resin to constitute a thermosetting furan resin composition which can make a cured product having improved elongation percentage and improved adhesion to glass fiber etc., and a method for producing the same.

The present invention also provides a thermosetting furan resin composition containing the furan resin, a cured product of the resin composition, and a furan resin composite in which the resin composition is used.

Solution to Problem

The outline of the present invention is described in the following [1] to [10].

[1] A furan resin comprising a repeating unit represented by the following general formula (1):

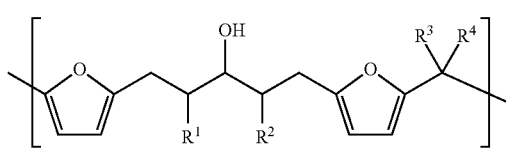

wherein $R^1$, $R^2$, $R^3$ and $R^4$ each independently represent a hydrogen atom, or an organic group having 1 to 8 carbon atoms which may contain a hetero atom in formula (1); and $R^1$ and $R^2$, and $R^3$ and $R^4$ may be connected to each other to form a cyclic structure.

[2] The furan resin according to the item [1], wherein the resin comprises a repeating unit represented by the following general formula (1) and a repeating unit represented by the following general formula (2):

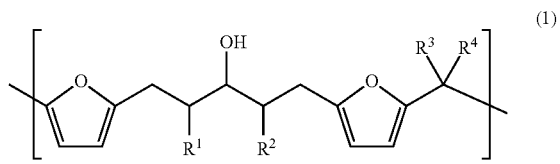

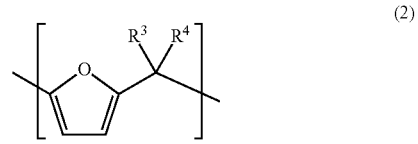

wherein $R^1$, $R^2$, $R^3$, $R^4$, $R^5$ and $R^6$ each independently represent a hydrogen atom, or an organic group having 1 to 8 carbon atoms which may contain a hetero atom in formulas (1) and (2); and $R^1$ and $R^2$, $R^3$ and $R^4$, and $R^5$ and $R^6$ may be connected to each other to form a cyclic structure.

[3] The furan resin according to the item [1], wherein $R^1$, $R^2$, $R^3$ and $R^4$ in the general formula (1) each represent a hydrogen atom.

[4] The furan resin according to the item [2], wherein $R^1$, $R^2$, $R^3$, $R^4$, $R^5$ and $R^6$ in the general formulas (1) and (2) each represent a hydrogen atom.

[5] A method for producing the furan resin according to the item [1] or [3], comprising reacting a furan compound represented by the following general formula (3) and a carbonyl compound represented by the following general formula (4) in the presence of an acid catalyst:

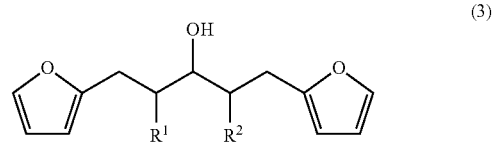

wherein $R^1$, $R^2$, $R^3$ and $R^4$ in formulas (3) and (4) are equivalent to $R^1$, $R^2$, $R^3$ and $R^4$, respectively, in formula (1).

[6] A method for producing the furan resin according to the item [2] or [4], comprising reacting a furan compound represented by the following general formula (3), a carbonyl compound represented by the following general formula (4), and a furan compound represented by the following general formula (5) in the presence of an acid catalyst:

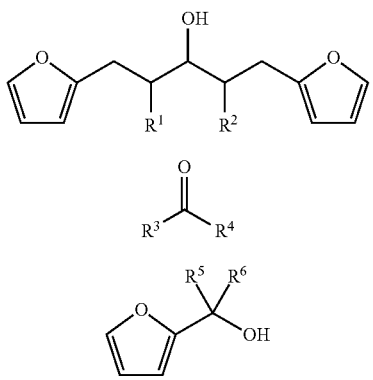

wherein $R^1$, $R^2$, $R^3$, $R^4$, $R^5$ and $R^6$ in formulas (3), (4), and (5) are equivalent to $R^1$, $R^2$, $R^3$, $R^4$, $R^5$ and $R^6$, respectively, in formulas (1) and (2).

[7] A thermosetting furan resin composition comprising the furan resin according to any one of the items [1] to [4] and at least one of a curing catalyst and a curing agent.

[8] A cured product of the thermosetting furan resin composition according to the item [7].

[9] A furan resin composite comprising the cured product according to the item [8] and a fibrous substrate.

[10] A furan resin composite produced by impregnating a fibrous substrate with the thermosetting furan resin composition according to the item [7] and then curing the resin composition.

Advantageous Effects of Invention

The present invention can provide a furan resin to constitute a thermosetting furan resin composition which can make a cured product having improved elongation percentage and improved adhesion to glass fiber etc., and a method for producing the same.

The present invention can also provide a thermosetting furan resin composition containing the above-mentioned furan resin, a cured product of the resin composition, and a furan resin composite in which the resin composition is used.

DESCRIPTION OF EMBODIMENTS

[Furan Resin]

Figure 1:
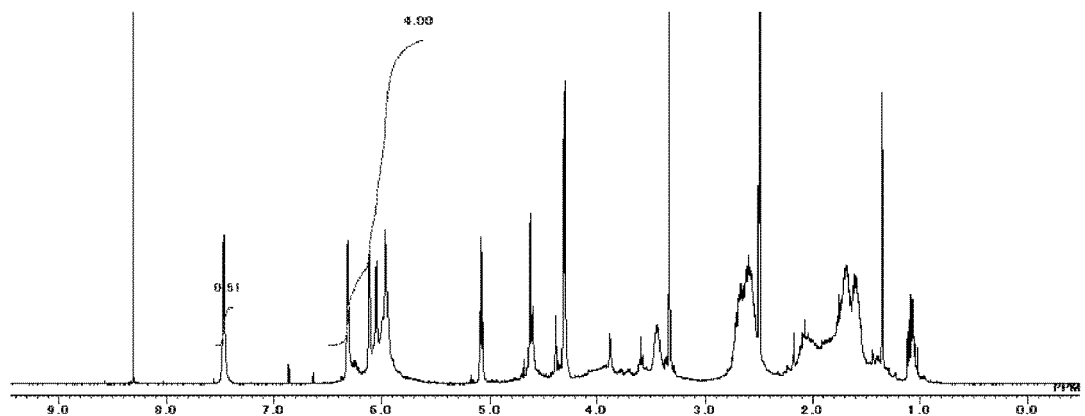
FIG. 1 is a chart showing the $^1$H-NMR spectrum of the furan resin obtained in Example 1.

The furan resin of the present invention has a repeating unit represented by the following general formula (1):

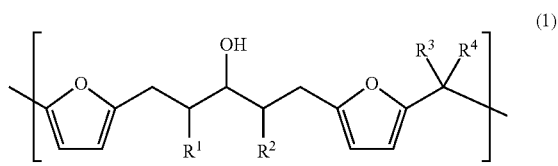

wherein $R^1$, $R^2$, $R^3$ and $R^4$ each independently represent a hydrogen atom, or an organic group having 1 to 8 carbon atoms which may contain a hetero atom; and $R^1$ and $R^2$, and $R^3$ and $R^4$ may be connected to each other to form a cyclic structure.

In the general formula (1), $R^1$, $R^2$, $R^3$ and $R^4$ each independently represent a hydrogen atom, or an organic group having 1 to 8 carbon atoms which may contain a hetero atom.

Examples of the organic group having 1 to 8 carbon atoms include a methyl group, an ethyl group, various propyl groups, various butyl groups, various pentyl groups, various hexyl groups, various heptyl groups, and various octyl groups. Herein, the term "various" means various isomers including n-, sec-, tert-, and iso-.

Examples of the hetero atom include a nitrogen atom, a sulfur atom, an oxygen atom and a phosphorus atom.

In the general formula (1), preferably $R^1$, $R^2$, $R^3$ and $R^4$ are each independently at least one selected from a hydrogen atom, a methyl group, and an ethyl group, and more preferably all of $R^1$, $R^2$, $R^3$ and $R^4$ are a hydrogen atom, from the viewpoint of easiness of production.

The furan resin having a repeating unit with $R^1$, $R^2$, $R^3$ and $R^4$ each being a hydrogen atom in the general formula (1) can be produced by the production method of the present invention using, for example, 1-5-difuranyl-3-pentanol and formaldehyde as raw material monomers.

Alternatively, the furan resin of the present invention may have a repeating unit represented by the following general formula (1) and a repeating unit represented by the following general formula (2):

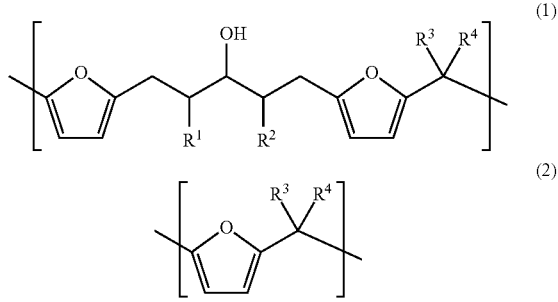

wherein $R^1$, $R^2$, $R^3$, $R^4$, $R^5$ and $R^6$ each independently represent a hydrogen atom, or an organic group having 1 to 8 carbon atoms which may contain a hetero atom; and $R^1$ and $R^2$, $R^3$ and $R^4$, and $R^5$ and $R^6$ may be connected to each other to form a cyclic structure.

In the general formulas (1) and (2), $R^1$, $R^2$, $R^3$, $R^4$, $R^5$ and $R^6$ each independently represent a hydrogen atom, or an organic group having 1 to 8 carbon atoms which may contain a hetero atom.

Examples of the organic group having 1 to 8 carbon atoms include a methyl group, an ethyl group, various propyl groups, various butyl groups, various pentyl groups, various hexyl groups, various heptyl groups, and various octyl groups. Herein, the term "various" means various isomers including n-, sec-, tert-, and iso-.

Examples of the hetero atom include a nitrogen atom, a sulfur atom, an oxygen atom and a phosphorus atom.

In the general formulas (1) and (2), preferably $R^1$, $R^2$, $R^3$, $R^4$, $R^5$ and $R^6$ are each independently at least one selected from a hydrogen atom, a methyl group, and an ethyl group, and more preferably all of $R^1$, $R^2$, $R^3$, $R^4$, $R^5$ and $R^6$ are a hydrogen atom, from the viewpoint of easiness of production.

The furan resin having repeating units with $R^1$, $R^2$, $R^3$, $R^4$, $R^5$ and $R^6$ each being a hydrogen atom in the general formulas (1) and (2) can be produced by the production method of the present invention using, for example, 1-5-difuranyl-3-pentanol, formaldehyde, and furfuryl alcohol as raw material monomers.

In the case of the furan resin of the present invention containing both of the repeating unit represented by the general formula (1) and the repeating unit represented by the general formula (2), the amount of the repeating unit represented by the general formula (1) with respect to the total amount of the repeating unit represented by the general formula (1) and the repeating unit represented by the general formula (2) may be 1 to 99 mol %. The amount of the repeating unit represented by the general formula (2) can be controlled by the added amount.

The furan resin of the present invention may have a repeating unit other than the repeating unit represented by the general formula (1) and the repeating unit represented by the general formula (2). Examples of the other repeating unit include a repeating unit derived from aldehydes, phenols, melamine, and urea.

Examples of the aldehydes to constitute the other repeating unit include formaldehyde, acetaldehyde, glyoxal, glutaraldehyde, and terephthalaldehyde.

Examples of the phenols to constitute the other repeating unit include phenol, cresol, resorcin, bisphenol A, bisphenol C, bisphenol E, and bisphenol F.

In the case of the furan resin of the present invention having the other repeating unit, the content of the other repeating unit in the furan resin may be 1 to 99 mol %.

The furan resin of the present invention may have a number average molecular weight (Mn) of preferably 300 to 500,000, more preferably 300 to 400,000, still more preferably 300 to 300,000, from the viewpoint of improving the elongation percentage of the cured product of the furan resin and the viewpoint of improving the adhesion of the cured product.

The furan resin of the present invention may have a weight average molecular weight (Mw) of preferably 500 to 1,000,000, more preferably 500 to 900,000, still more preferably 500 to 800,000, from the viewpoint of improving the elongation percentage of the cured product and the viewpoint of improving the adhesion of the cured product.

In the present specification, the number average molecular weight and the weight average molecular weight of the furan resin are expressed in terms of polystyrene obtained from GPC (Gel Permeation Chromatography) measurement.

The furan resin of the present invention may have a molecular weight distribution (Mw/Mn) of preferably 1.1 to 20, more preferably 1.1 to 15, still more preferably 1.1 to 10, furthermore preferably 1.1 to 7, furthermore preferably 1.1 to 5, from the viewpoint of obtaining a uniform furan resin.

[Method for Producing Furan Resin]

The method for producing a furan resin of the present invention is a production method of reacting a furan compound represented by the following general formula (3) and a carbonyl compound represented by the following general formula (4) in the presence of an acid catalyst. According to the method for producing a furan resin of the present invention, the furan resin of the present invention can be efficiently produced.

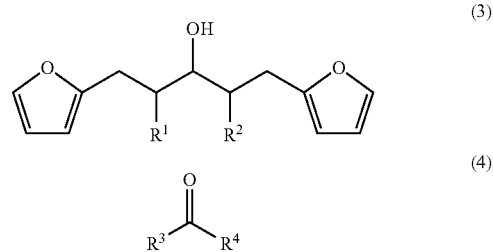

wherein $R^1$, $R^2$, $R^3$ and $R^4$ in formulas (3) and (4) are equivalent to $R^1$, $R^2$, $R^3$ and $R^4$, respectively, in formula (1).

Alternatively, the method for producing a furan resin of the present invention may be a production method of reacting a furan compound represented by the following general formula (3), a carbonyl compound represented by the following general formula (4), and a furan compound represented by the following general formula (5) in the presence of an acid catalyst.

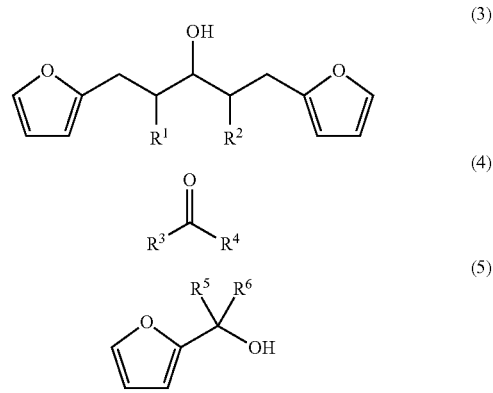

wherein $R^1$, $R^2$, $R^3$, $R^4$, $R^5$ and $R^6$ in formulas (3), (4), and (5) are equivalent to $R^1$, $R^2$, $R^3$, $R^4$, $R^5$ and $R^6$, respectively, in formulas (1) and (2).

The furan compound represented by the general formula (3) can be obtained, for example, by appropriately reacting furfural and ketones according to the following reaction formulas (6) to (8).

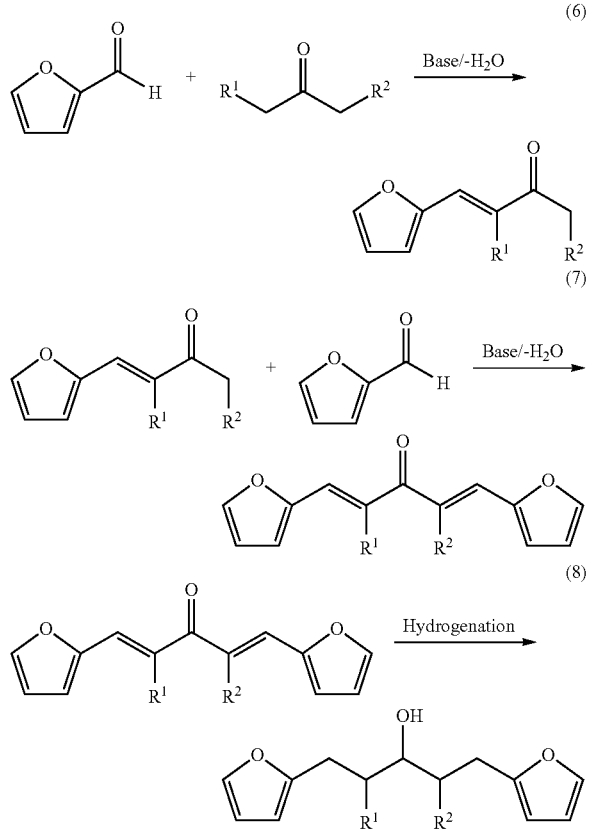

wherein R¹ and R² in formulas (6) to (8) are equivalent to R¹ and R², respectively, in formula (1).

A method for producing the furan compound represented by the general formula (3) is also described in the following literature: Rong Xing, Ayyagari V. Subrahmanyam, Hakan Olcay, Wei Qi, G. Peter van Walsum, Hemant Pendseb and George W. Huber, Green Chem., 2010, 12, 1933-1946; Paula A. Zapata, Jimmy Faria, M. Pilar, Ruiz & Daniel E. Resasco, Top Catal, 2012, 55, 38-52; etc.

Examples of the carbonyl compound represented by the general formula (4) include formaldehyde, acetone, methyl ethyl ketone, methyl isobutyl ketone, diisobutyl ketone, cyclopentanone, and cyclohexanone. In particular, formaldehyde is preferred from the viewpoint of reactivity.

In the case of using formaldehyde, paraformaldehyde as a polymer of formaldehyde may be used. In the case of using paraformaldehyde in the reaction, formaldehyde is formed by depolymerization in the reaction system and the formaldehyde reacts with the furan compound represented by the general formula (3), so that the same furan resin can be obtained as in the case of using formaldehyde.

Examples of the furan compound represented by the general formula (5) include furfuryl alcohol, 1-(2-furyl) ethanol, and 2-amino-1-(2-furyl)ethanol. Furfuryl alcohol is preferred from the viewpoint of reactivity. The furan compound represented by the general formula (5) constitutes the repeating unit represented by the general formula (2), and can be also expected to function as a reactive diluent to be described below.

Examples of the acid catalyst usable in the present invention include an inorganic acid such as sulfuric acid and phosphoric acid, a sulfonic acid such as benzene sulfonic acid, paratoluene sulfonic acid, xylene sulfonic acid, and methane sulfonic acid, and an organic carboxylic acid such as tartaric acid, citric acid, malic acid, glycolic acid, lactic acid, benzoic acid, and formic acid.

Among them, inorganic acids are preferred, and phosphoric acid is more preferred, from the viewpoint of reaction efficiency.

The amount of the acid catalyst used is preferably 0.01 to 10 parts by mass, more preferably 0.05 to 5 parts by mass, relative to 100 parts by mass of raw material monomers, from the viewpoint of reducing the production time.

Prior to the polymerization with an acid catalyst in the method for producing a furan resin of the present invention, a catalyst other than the acid catalysts may be added to perform a preliminary reaction. For example, when a preliminary reaction is performed with an alkali catalyst etc., the methylolation of the furan ring of the furan compound is accelerated, so that the subsequent polymerization reaction tends to be accelerated. In addition, the curability of a thermosetting furan resin composition which contains the furan resin thus obtained is improved.

Examples of the catalyst other than the acid catalysts which can be used in such a purpose include an alkali metal hydroxide such as lithium hydroxide, sodium hydroxide, and potassium hydroxide, an alkaline earth metal hydroxide such as magnesium hydroxide, calcium hydroxide, and barium hydroxide, an alkaline earth metal oxide such as magnesium oxide, calcium oxide, and barium oxide, a metal salt of organic acid such as magnesium acetate, zinc acetate, and zinc formate, ammonia water, amines such as triethylamine, and an alkaline substance such as sodium carbonate and potassium carbonate.

The amount of the catalyst other than the acid catalyst used is preferably 0.01 to 10 parts by mass, more preferably 0.05 to 5 parts by mass, relative to 100 parts by mass of the raw material monomers.

In the method for producing a furan resin of the present invention, the reaction is performed preferably using a solvent. Examples of the solvent include water, an alcohol solvent such as ethanol, n-propanol, isopropanol, n-butanol, 2-butanol, and isobutanol, an ether solvent such as dibutyl ether, tetrahydrofuran, and dioxane, an aliphatic hydrocarbon solvent such as pentane and hexane, an aromatic hydrocarbon solvent such as toluene and xylene, and a halogenated hydrocarbon solvent such as methylene chloride. One of these may be used singly or two or more of these may be used in combination.

Among them, water and an alcohol solvent having 2 to 4 carbon atoms are preferred from the viewpoint of easy availability etc.

In the production method of the present invention, the reaction temperature is preferably about 50 to 150° C., more preferably about 50 to 130° C., still more preferably 55 to 110° C., furthermore preferably about 55 to 90° C., furthermore preferably about 60 to 70° C. and the reaction time is preferably about 1 to 10 hours, more preferably about 1 to 7 hours.

Prior to completion of the reaction in the present invention, at least one of the furan compound, the carbonyl compound and an acid catalyst may be added to the reaction system for a further reaction.

The reaction can be terminated by adding an alkaline aqueous solution such as sodium hydroxide aqueous solution into the reaction system for neutralization. Consequently, an intended furan resin can be obtained.

In the production method of the present invention, catalyst residues and the others may be removed by a refining operation after the neutralization.

[Thermosetting Furan Resin Composition]

The thermosetting furan resin composition of the present invention contains the furan resin of the present invention and at least one of a curing catalyst and a curing agent. When the composition is cured, a cured product having both strength and elongation percentage, and high adhesion to glass fiber or the like, can be obtained.

The content of the furan resin of the present invention in the thermosetting furan resin composition of the present invention can be 10 to 99.9 mass % from the viewpoint of improving the elongation percentage of a cured product, and from the viewpoint of improving the adhesion to glass fiber or the like.

[Curing Catalyst]

As the curing catalyst, although any curing catalysts capable of curing a furan resin may be used without particular limitation, and, for example, an inorganic acid such as sulfuric acid, phosphoric acid, and hydrochloric acid, or an organic acid such as an organic sulfonic acid and an organic carboxylic acid may be used.

Examples of the organic sulfonic acid include paratoluene sulfonic acid, benzene sulfonic acid, xylene sulfonic acid, and methane sulfonic acid.

Examples of the organic carboxylic acid include malonic acid, succinic acid, maleic acid, oxalic acid, acetic acid, lactic acid, malic acid, tartaric acid, benzoic acid, and citric acid.

One of these may be used singly or two or more of these may be used in combination.

In the case of the thermosetting furan resin composition containing a curing catalyst, the content is preferably 0.01 to 10 parts by mass, more preferably 0.5 to 5 parts by mass, relative to 100 parts by mass of the furan resin.

The thermosetting furan resin composition of the present invention may contain a heat-reactive latent acid curing catalyst in addition to the curing catalyst. As the heat-reactive latent acid curing catalyst, any heat-reactive latent acid curing catalysts which do not react with the components contained in a thermosetting furan resin composition at normal temperature (25° C.) and are rapidly decomposed to generate an acid by heating for curing may be used without particular limitation. Specific examples of the heat-reactive latent acid curing catalyst contain preferably at least any one of an inorganic ammonium salt, a primary amine salt, a secondary amine salt, and a tertiary amine salt, more preferably at least any one selected from ammonium chloride, ammonium sulfate, ammonium nitrate, ammonium methyl chloride, ammonium dimethyl chloride, ammonium ethyl chloride, and ammonium diethyl chloride, from the viewpoint of the stability at normal temperature and the reaction rate during heating for curing. One of these may be used singly or two or more of these may be used in combination.

In the case of the thermosetting furan resin composition containing a heat-reactive latent acid curing catalyst, the content thereof is preferably 0.01 to 10 parts by mass, more preferably 0.5 to 5 parts by mass, relative to 100 parts by mass of the furan resin.

[Curing Agent]

The thermosetting furan resin composition of the present invention may contain a curing agent to form a cross-linked network in the cured product. Examples of the curing agent include a bismaleimide compound and a multifunctional (meth)acrylic compound.

Examples of the bismaleimide compound include N,N'-ethylene bismaleimide, N,N'-hexamethylene bismaleimide, N,N'-(1,3-phenylene)bismaleimide, N,N'-[1,3-(2-methyl-phenylene)]bismaleimide, N,N'-[1,3-(4-methylphenylene)] bismaleimide, N,N'-(1,4-phenylene)bismaleimide, bis(4-maleimidephenyl)methane, bis(3-methyl-4-maleimidephenyl)methane, 3,3-dimethyl-5,5-diethyl-4,4-diphenylmethane bismaleimide, and bis(4-maleimidephenyl)ether.

Examples of the multifunctional (meth)acrylic compound include a bifunctional (meth)acrylate compound such as ethylene glycol di(meth)acrylate, diethylene glycol di(meth)acrylate, triethylene glycol di(meth)acrylate, and tri- or more functional (meth)acrylate compound such as trimethylol propane tri(meth)acrylate, pentaerythritol tri(meth)acrylate, ditrimethylol propane tetra(meth)acrylate, pentaerythritol tetra(meth)acrylate, and dipentaerythritol penta(meth)acrylate. In the present specification, the term "(meth)acrylate" means "acrylate or methacrylate".

In the case of the thermosetting furan resin composition containing a curing agent, the content is preferably 0.01 to 100 parts by mass, more preferably 0.5 to 50 parts by mass, relative to 100 parts by mass of the furan resin.

[Reactive Diluent]

The thermosetting furan resin composition of the present invention may contain a reactive diluent from the viewpoint of controlling the viscosity and from the viewpoint of controlling the reactivity.

As the reactive diluent, any reactive diluents which have a low viscosity and compatibility with the furan resin and react to be solidified when the thermosetting furan resin composition is cured may be used without particular limitation, and, for example, furfuryl alcohol described above, furfural, or a mixture of furfuryl alcohol and furfural are preferred.

In the case of the thermosetting furan resin composition containing a reactive diluent, the content is preferably 10 to 130 parts by mass, more preferably 40 to 110 parts by mass, relative to 100 parts by mass of the furan resin.

[Filler]

The thermosetting furan resin composition of the present invention may contain a filler. Examples of the filler include an inorganic filler, carbon powder, and an organic filler such as wood powder.

Examples of the inorganic filler include a metal hydroxide and metal oxide such as aluminum hydroxide, magnesium hydroxide, calcium oxide, magnesium oxide, aluminum oxide, zinc oxide, titanium oxide, and antimony oxide, a powder of metal such as zinc, a metal carbonate such as calcium carbonate, magnesium carbonate, barium carbonate, and zinc carbonate, calcium sulfate, barium sulfate, calcium silicate, mica, talc, bentonite, zeolite, silica gel, aluminum oxide, and glass powder. One of these fillers may be used singly or two or more of these may be used in combination.

The inorganic filler is preferably surface-treated with a surface treating agent, from the viewpoint of improving the interface adhesion with the furan resin. As the surface treating agent, an organic silane surface treating agent is preferred, and specifically, an aminosilane surface treating agent, an epoxysilane surface treating agent, and an acrylsilane surface treating agent are more preferred.

In the case of the thermosetting furan resin composition containing a filler, the content thereof is preferably 10 to 300 parts by mass, more preferably 30 to 250 parts by mass, relative to 100 parts by mass of the furan resin.

[Salt]

The thermosetting furan resin composition of the present invention may contain a salt from the viewpoint of reducing the dimensional shrinkage of a cured product.

As the salt, at least one selected from sodium chloride, lithium chloride, sodium bromide, and lithium bromide is preferred. Among them, lithium chloride is more preferred from the viewpoint of further reducing the dimensional shrinkage of a cured product and from the viewpoint of the solubility into the furan resin at normal temperature.

In the case of the thermosetting furan resin composition containing a salt, the content is preferably 0.2 to 10 parts by mass, more preferably 0.5 to 5 parts by mass, relative to 100 parts by mass of the furan resin.

<Other Components>

The thermosetting furan resin composition of the present invention may contain an optional component such as a plasticizer and an antifoaming agent within a range not impairing the object of the present invention, on an as-needed basis.

Examples of the plasticizer include a phthalic acid ester such as diethyl phthalate and dibutyl phthalate, a phosphoric acid ester, an aliphatic acid ester, and an epoxy plasticizer.

Examples of the antifoaming agent include a foam-breaking polymer antifoaming agent such as an oil-type silicone antifoaming agent, an emulsion-type silicone antifoaming agent, and a non-ionic polyether, a special non-ionic surfactant, a polyether modified methylalkyl-polysiloxane copolymer, a polyethylene glycol-type non-ionic surfactant, and a vegetable oil-based antifoaming agent. Among them, an emulsion-type silicone antifoaming agent and a foam-breaking polymer antifoaming agent are preferred.

One of these may be used singly, or two or more of these may be used in combination.

<Method for Producing Thermosetting Furan Resin Composition>

The thermosetting furan resin composition of the present invention can be produced by mixing the furan resin of the present invention, the curing catalyst, and each of the components described above on an as-needed basis, using a homodisper or the like.

[Cured Product]

The cured product of the present invention is made by curing the thermosetting furan resin composition of the present invention. The cured product has excellent strength and elongation percentage, and high adhesion to glass fiber or the like.

<Method for Producing Cured Product>

The cured product of the present invention can be obtained by heat-curing the thermosetting furan resin composition. In the method for heat-curing the thermosetting furan resin composition, curing may be performed, for example, by heating the thermosetting furan resin composition accommodated in a container or a mold with a predetermined shape in a thermostatic chamber or a thermostatic water tank controlled at 40 to 130° C. Alternatively, curing may be performed by circulating hot air or hot water controlled at 40 to 130° C. in the container or the mold with a predetermined shape.

Alternatively, curing may be performed by heating the thermosetting furan resin composition cast on a film of polyethylene terephthalate, polyimide, or the like in an oven or the like.

The heat-curing temperature is preferably 50 to 200° C., though not particularly limited, and the heat-curing time is, for example, preferably 1 to 5 hours.

[Furan Resin Composite]

The furan resin composite of the present invention is a complex of the cured product of the present invention and a fibrous substrate, and more specifically, the composite is produced by impregnating a fibrous substrate with the thermosetting furan resin composition of the present invention and then curing the resin composition.

Examples of the fibrous substrate to be impregnated with the thermosetting furan resin composition include a fabric of glass fiber, carbon fiber, metal fiber, paper, cotton, hemp, or the like, a nonwoven fabric, a chopped strand mat, and a roving cloth.

As the material for the nonwoven fabric, polyester, high-density polyethylene (HDPE), polypropylene, and the like are preferred. A felt, a mat, a spun bonded fabric, a web, or the like which is a porous material with flexibility, having continuous filaments or staple fibers, may be also used.

The chopped strand mat is produced, for example, preferably by cutting strands of glass fiber or the like into a predetermined length to be dispersed in a mat form, and then uniformly applying an adhesive of a thermoplastic resin or the like to be thermally melted such that the strands are adhered to each other to form a mat.

The roving cloth is preferably formed of reinforced fiber such as glass fiber, carbon fiber, aramid fiber, inorganic fiber, organic fiber, and whisker. The reinforced fiber having a fiber diameter of 3 to 25 μm is preferred, and the reinforced fiber having a fiber diameter of 5 to 20 μm is more preferred from the viewpoint of the strength and the cost.

Among them, glass fiber is preferred due to the excellent balance between the strength and the cost, as well as good adhesion to the cured product of the present invention.

<Method for Producing Furan Resin Composite>

The furan resin composite of the present invention can be produced by impregnating a fibrous substrate with the thermosetting furan resin composition and then curing the resin composition.

The method for impregnating a fibrous substrate with the thermosetting furan resin composition is not particularly limited, and examples thereof include a method for impregnating a fibrous substrate with the thermosetting furan resin composition by using an impregnating roll. The amount of the thermosetting furan resin composition for the impregnation is not particularly limited.

The method for curing the thermosetting furan resin composition with which a fibrous substrate is impregnated is not particularly limited, and examples thereof include a method for heat-curing the fibrous substrate impregnated with the composition placed in a mold with hot air or between hot plates.

The heat-curing temperature is preferably 50 to 200° C., though not particularly limited, and the heat-curing time is, for example, preferably 1 hour or more, more preferably 1 to 6 hours.

The furan resin composite of the present invention is made of a cured product excellent in elongation percentage and adhesion, so that the composite has good elongation percentage and good adhesion between the fibrous substrate and the cured product.

EXAMPLES

The following examples are provided to illustrate the present invention but are not intended to limit the scope of the invention.

Example 1

A furan resin was produced according to the following procedure. The reaction in Example 1 is represented by a reaction formula (9). In the reaction in Example 1, a furan resin having a hydrogen atom at a single terminal may be obtained in addition to the furan resin having a CH₂OH group at both of the terminals represented by the reaction formula (9).

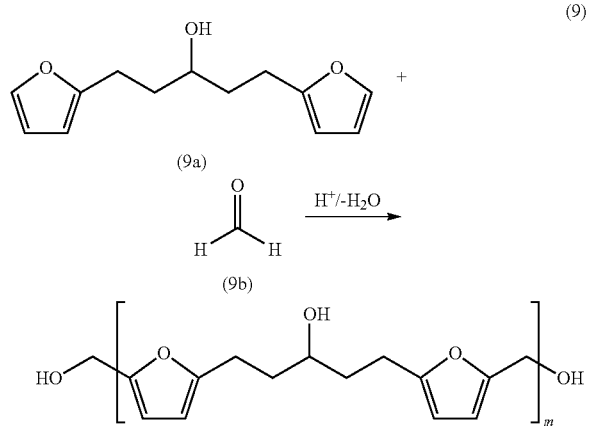

(9)

wherein m represents the degree of polymerization.

In a three-neck flask equipped with a cooling tube, a thermometer, and a nitrogen inlet, 5 g of a furan compound (9a), 0.76 g of paraformaldehyde (9b), 0.03 g of 85 mass % phosphoric acid, and 5 ml of isopropanol were mixed, subjected to nitrogen bubbling for 30 minutes, and then heated in an oil bath at 90° C. for 3 hours for a reaction to proceed.

Subsequently, 0.76 g of paraformaldehyde (9b) and 0.03 g of 85 mass % phosphoric acid were further added thereto, and the temperature of the oil bath was raised to 110° C. for a reaction to proceed under reflux for 2 hours.

Subsequently, the mixture was cooled to room temperature, diluted with tetrahydrofuran, and neutralized with sodium hydroxide aqueous solution for the reaction to stop. After the solvent was removed with an evaporator, 50 ml of chloroform was added for dilution, and the organic phase was washed with a 20 mass % sodium chloride aqueous solution three times. Subsequently, after separation of the aqueous phase, magnesium sulfate was added to the organic phase for drying. Further, chloroform was removed with an evaporator, so that 5.87 g of a dark red viscous furan resin was obtained.

The furan resin obtained had a number average molecular weight (Mn) of 760, a weight average molecular weight (Mw) of 1,730, and a molecular weight distribution (Mw/Mn) of 2.29, resulting from the GPC measurement according to the following method.

Under the following conditions, ¹H-NMR spectrum and FT-IR spectrum were also measured. From the comparison between the measurement results (FIG. 1) and the measurement results (FIG. 2) of the furan compound (9a) as raw material monomer, the generation of the furan resin was confirmed.

Specifically, it was confirmed that the integral value of the proton at the fifth position of the furan ring of the product furan resin greatly decreased in comparison with the integral value of the proton at the fifth position of the raw material furan compound.

Figure 2:
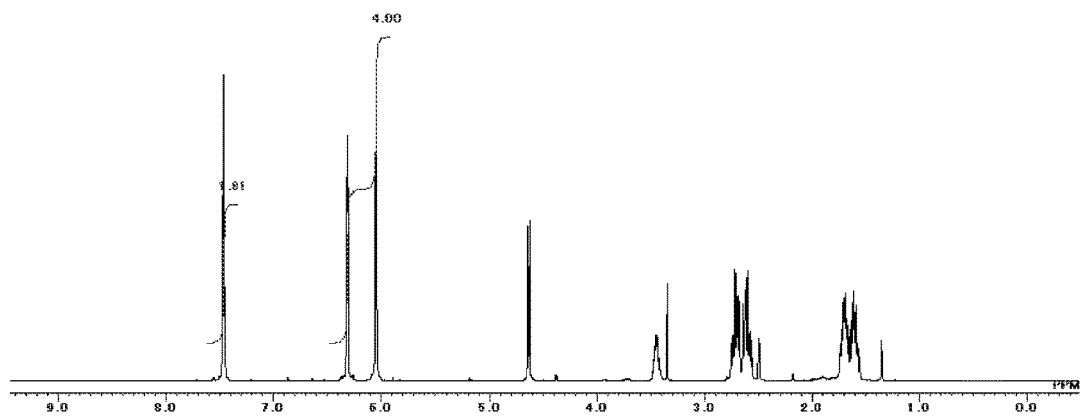
FIG. 2 is a chart showing the $^1$H-NMR spectrum of the furan compound used in Example 1.
Figure 3:
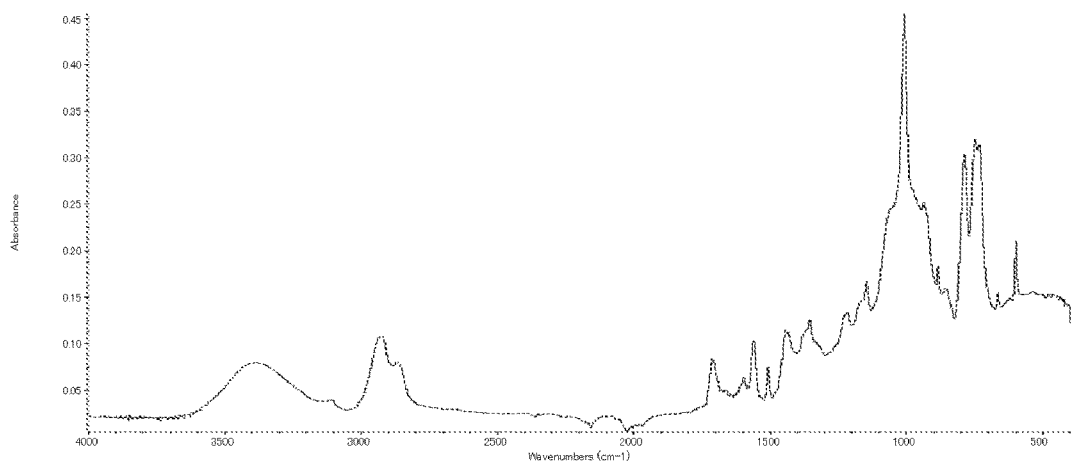
FIG. 3 is a chart showing the FT-IR spectrum of the furan resin obtained in Example 1.
Figure 4:
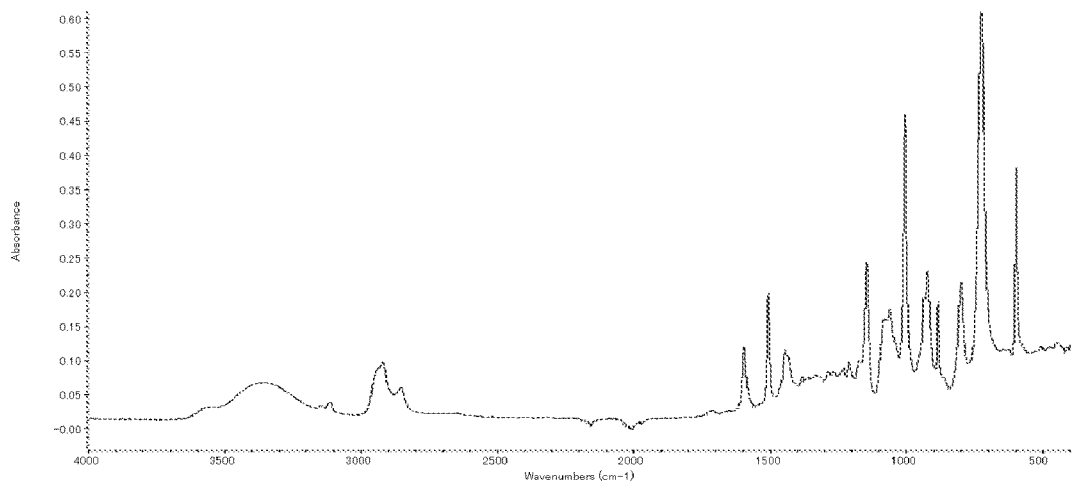
FIG. 4 is a chart showing the FT-IR spectrum of the furan compound used in Example 1.

In FIG. 1 also, the peak of the proton bonded to the carbon derived from formaldehyde (CH₂) was confirmed at a position of 4.30 to 4.31 ppm, and the peak of the CH₂OH at the terminal was confirmed in the vicinity of 5.07 to 5.10 ppm.

Further, while the peaks at the third position and the fourth position of the furan ring of the raw material furan compound were confirmed at 6.05 ppm and 6.32 ppm (FIG. 2), it was confirmed that the peaks at the third position and the fourth position of the furan ring of the product furan resin shifted to positions at 5.97 ppm and 6.12 ppm (FIG. 1).

From the results described above, the formation of the intended furan resin was confirmed.

<Measurement Conditions>

[GPC Measurement]

A GPC system manufactured by Shimadzu Corporation with columns "TSKgel G2000HXL"×2 (exclusion limit molecular weight: 10,000) was used. The column temperature was set at 40° C., and the flow rate was set at 1.0 ml/min. Tetrahydrofuran was used as developer solvent, and an RI was used as detector.

In the method for calculating a molecular weight, a calibration curve was made using standard polystyrenes "TSK standard POLYSTYLENE" having weight average molecular weights (Mw) of 18,100, 10,200, 5,970, 2,630, 1,050 and 453, respectively. The weight average molecular weight (Mw), the number average molecular weight (Mn), and the molecular weight distribution were obtained by calculation.

[Measurement of ¹H-NMR Spectrum]

Using an NMR measurement apparatus "ECX-400" manufactured by JEOL limited, the measurement was performed at 23° C. in a solvent of deuterated chloroform or deuterated DMSO. The ¹H-NMR spectrum measured using deuterated DMSO as solvent is shown in FIG. 1.

[FT-IR Measurement]

The measurement was performed by an ATR method using "NICOLET 380" manufactured by Thermo Electron as spectrometer.

Examples 2 and 3 and Comparative Example 1

Example 2

In a three-neck flask equipped with a cooling tube, a thermometer, and a nitrogen inlet, 400 g of a furan compound (9a), 294.4 g of 37 mass % formalin solution (9b), and 30.6 g of acetic acid were mixed. The mixture was exposed to the flow of nitrogen for 30 minutes, and then heated to 65° C. for 4.5 hours for a reaction to proceed.

Subsequently, after cooling down to room temperature, the mixture was neutralized with a 5 mass % sodium hydroxide aqueous solution, and the aqueous phase was separated off. Ethyl acetate was added to the obtained liquid for dilution. After washing with 5 mass % sodium hydrogen carbonate aqueous solution and saturated sodium chloride aqueous solution, the aqueous phase was separated and magnesium sulfate was added to the organic phase for drying. Subsequently, ethyl acetate was distilled off under reduced pressure, so that a dark orange liquid furan resin was obtained.

The GPC measurement of the furan resin obtained was performed in the same manner as in Example 1, and resulted in an Mn of 570, an Mw of 720, and a molecular weight distribution (Mw/Mn) of 1.26.

From the ¹H-NMR spectrum and the FT-IR spectrum measured in the same manner as in Example 1, the formation of the intended furan resin was confirmed.

Example 3

Except that 280 g of a furan compound (9a), 125 g of furfuryl alcohol, 114.6 g of 37 mass % formalin solution (9b), and 31.6 g of acetic acid were used, the reaction was performed in the same manner as in Example 2, so that a dark orange liquid furan resin was obtained.

The GPC measurement of the furan resin obtained was performed in the same manner as in Example 1, and resulted in an Mn of 730, an Mw of 1,120, and a molecular weight distribution (Mw/Mn) of 1.53.

From the $^1$H-NMR spectrum and the FT-IR spectrum measured in the same manner as in Example 1, the formation of the intended furan resin was confirmed.

Comparative Example 1

In a flask equipped with a cooling tube and a thermometer, 400 g of furfuryl alcohol, 112.5 g of paraformaldehyde, and 3.4 g of 10 mass % NaOH aqueous solution were placed and heated to 50° C., such that paraformaldehyde was fully dissolved in furfuryl alcohol. Subsequently 16 g of 10 mass % phosphoric acid aqueous solution and 65 g of ion-exchanged water were added to the mixture, of which the temperature was raised to 90° C. for a reaction to proceed for 1.5 hours.

After completion of the reaction, the reaction mixture was cooled to room temperature and neutralized to pH 6 with 50 mass % NaOH aqueous solution. Subsequently, the mixture was heated to 135° C. under reduced pressure to remove volatile components, so that a furfuryl alcohol-based furan resin was obtained.

Examples 4 and 5 and Comparative Example 2

Example 4

To 100 parts by mass of the furan resin obtained in Example 2, 1.5 parts by mass of 65 mass % p-toluene sulfonic acid aqueous solution was added and mixed to prepare a curable furan resin composition. The thermosetting furan resin composition was cast on a film of polyethylene terephthalate (PET) so as to be cured at 60° C. in a hot air oven for 1 hour and further cured at 80° C. for 3 hours. Consequently a blackish brown cured film with a thickness of 100 μm was obtained.

Example 5

Except that the furan resin obtained in Example 3 was used, a cured film was made in the same manner as in Example 4.

Comparative Example 2

Except that the resin obtained in Comparative Example 1 was used, a cured film was made in the same manner as in Example 4.

<Evaluation>

Each of the cured films obtained in Examples 4 and 5 and Comparative Example 2 was cut into a strip form with a width of 10 mm, which was subjected to a tensile test at a rate of 1 mm/min with a tensile testing machine and evaluated according to the following criteria. The results are shown in Table 1.

Breaking Elongation:
G (good): 2.5% or more
B (bad): less than 2.5%
Breaking Strength:
G (good): 35 MPa or more
B (bad): less than 35 MPa
Elastic Modulus:
G (good): 2 GPa or more
B (bad): less than 2 GPa
Determination:
G (good): All of the three evaluations were ranked as G (good).
B (bad): At least one of the three evaluations was ranked as B (bad).

TABLE 1

| | Breaking elongation | Breaking strength | Elastic modulus | Determination |
|---|---|---|---|---|
| Example 4 | G | G | G | G |
| Example 5 | G | G | G | G |
| Comparative Example 2 | B | G | G | B |

Each of the cured films in Examples 4 and 5 had excellent breaking elongation and favorable breaking strength and elastic modulus. In contrast, the cured film in Comparative Example 2 had poor breaking elongation, though having favorable breaking strength and elastic modulus.

Examples 6 and 7 and Comparative Example 3

Example 6

A glass fiber cloth was impregnated with the thermosetting furan resin composition prepared in Example 4 and laminated with a polyethylene sheet, which was constrained in a mold and cured in a hot air oven at 60° C. for 1 hour and further at 90° C. for 4 hours to obtain a furan resin composite with a thickness of 4 mm.

Example 7

Except that the thermosetting furan resin composition prepared in Example 5 was used, a furan resin composite was made in the same manner as in Example 6.

Comparative Example 3

Except that the thermosetting furan resin composition prepared in Comparative Example 2 was used, a furan resin composite was made in the same manner as in Example 6.

<Evaluation>

Each of the furan resin composites obtained in Examples 6 and 7 and Comparative Example 3 was subjected to a tensile test at a rate of 1 mm/min with a tensile testing machine in accordance with JIS-K7164 and evaluated according to the following criteria. The results are shown in Table 2.

Breaking Elongation:
G (good): 2.5% or more
B (bad): less than 2.5%
Breaking Strength:
G (good): 70 MPa or more
B (bad): less than 70 MPa
Elastic Modulus:
G (good): 4.5 GPa or more
B (bad): less than 4.5 GPa
Determination:
G (good): All of the three evaluations were ranked as G (good).
B (bad): At least one of the three evaluations was ranked as B (bad).

TABLE 2

|  | Breaking elongation | Breaking strength | Elastic modulus | Determination |
|---|---|---|---|---|
| Example 6 | G | G | G | G |
| Example 7 | G | G | G | G |
| Comparative Example 3 | B | G | G | B |

Each of the furan resin composites in Examples 6 and 7 had excellent breaking elongation and favorable breaking strength and elastic modulus. In contrast, the furan resin composite in Comparative Example 3 had poor breaking elongation, though having favorable breaking strength and elastic modulus.

Example 8

A furan resin was produced according to the following procedure. The reaction in Example 8 is represented by a reaction formula (10). In the reaction in Example 8, a furan resin having a hydrogen atom at a single terminal may be obtained in addition to the furan resin having a $CH_2OH$ group at both of the terminals represented by the reaction formula (10).

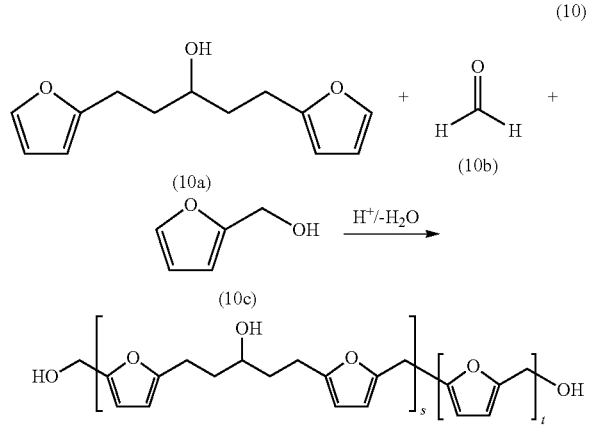

wherein s and t each independently represent the degree of polymerization.

In a flask equipped with a cooling tube and a thermometer, 8.98 g (0.041 mol) of a furan compound (10a), 14.40 g of paraformaldehyde (10b), 36.00 g (0.367 mol) of furfuryl alcohol (10c), and 0.34 g of a 10 mass % NaOH aqueous solution for the purpose of depolymerizing paraformaldehyde and performing the preliminary reaction were mixed, and heated to 60° C. to obtain a uniform solution.

Subsequently, 1.60 g of 10 mass % phosphoric acid aqueous solution and 6.5 g of ion-exchanged water were further added to the solution, of which the temperature was raised to 100° C. for a reaction to proceed for 90 minutes. Subsequently, the mixture was cooled to room temperature, and neutralized with 10 mass % NaOH aqueous solution for the reaction to stop.

Subsequently, the solution after reaction was heated to 140° C. under reduced pressure to remove volatile components, so that a dark brown liquid furan resin was obtained.

The GPC measurement of the furan resin obtained according to the following conditions resulted in a number average molecular weight (Mn) of 440, a weight average molecular weight (Mw) of 3,420, and a molecular weight distribution (Mw/Mn) of 7.77.

Figure 5:
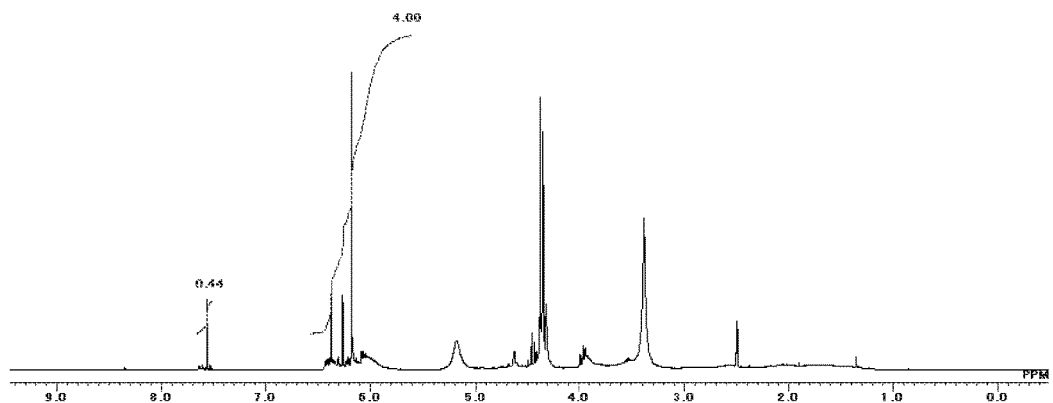
FIG. 5 is a chart showing the $^1$H-NMR spectrum of the furan resin obtained in Example 8.
Figure 6:
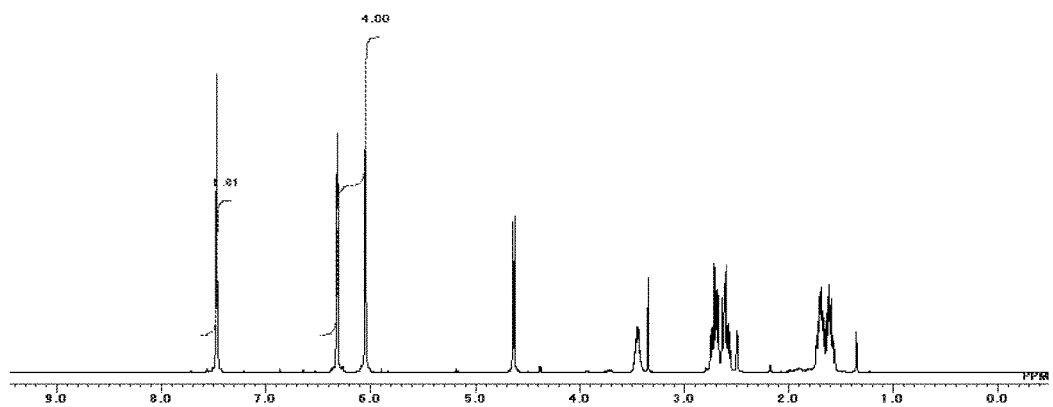
FIG. 6 is a chart showing the $^1$H-NMR spectrum of the furan compound used in Example 8.
Figure 7:
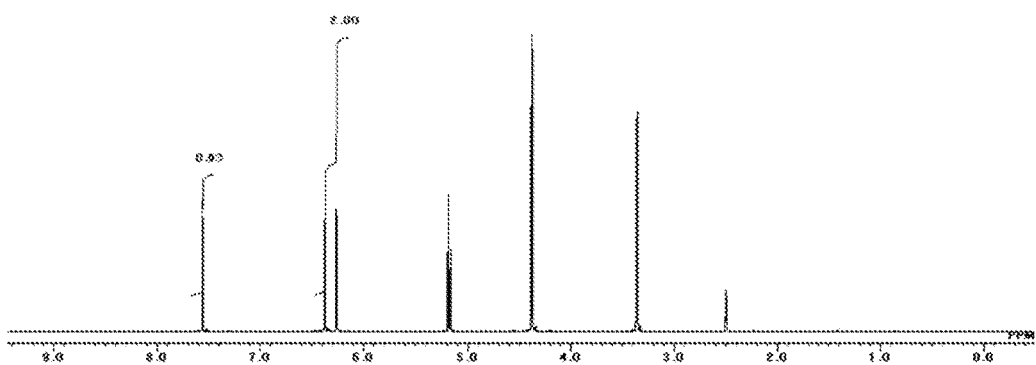
FIG. 7 is a chart showing the $^1$H-NMR spectrum of the furfuryl alcohol used in Example 8.

In the measurement of the $^1$H-NMR spectrum of the furan resin obtained under the following conditions, the peaks derived from the raw material monomers of furan compound (10a) and furfuryl alcohol (10c) were observed, and broad peaks were newly confirmed at 3.85 to 4.0 ppm and 5.85 to 6.45 ppm, which were not observed for the raw material monomers (FIGS. 5 to 7).

Figure 8:
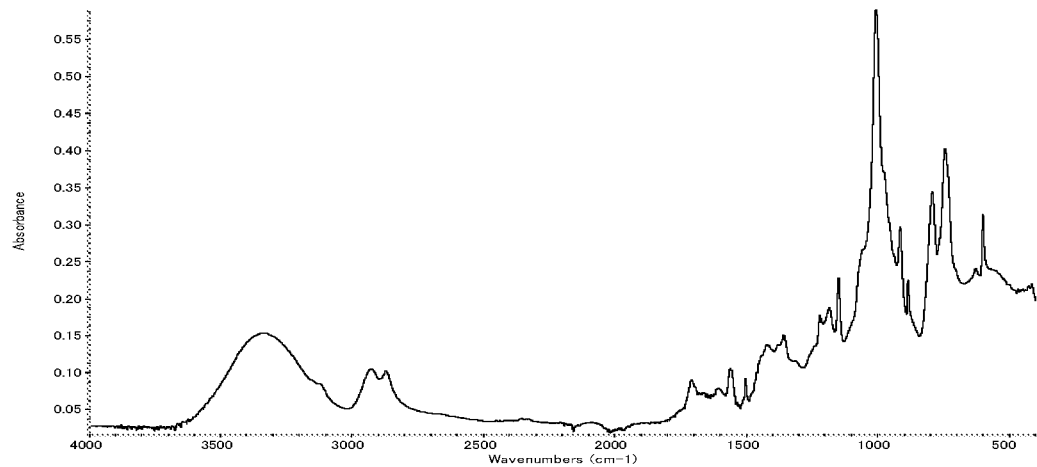
FIG. 8 is a chart showing the FT-IR spectrum of the furan resin obtained in Example 8.
Figure 9:
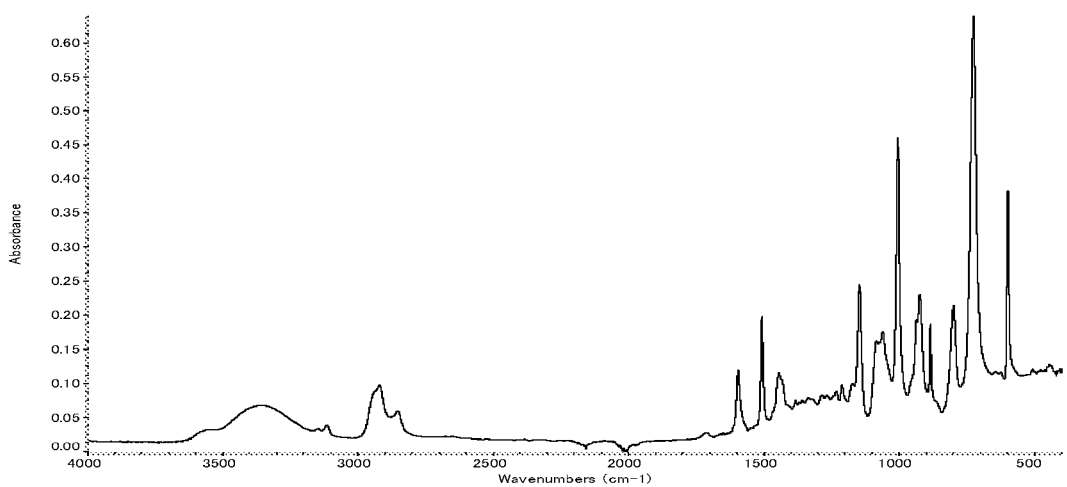
FIG. 9 is a chart showing the FT-IR spectrum of the furan compound used in Example 8.
Figure 10:
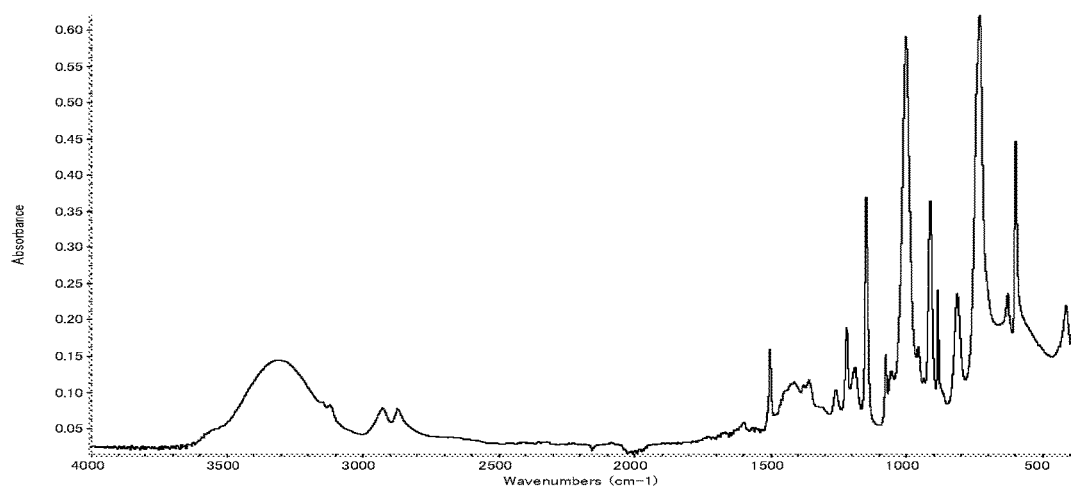
FIG. 10 is a chart showing the FT-IR spectrum of the furfuryl alcohol used in Example 8.

Since the integral value of the proton at the fifth position of the furan ring of the product furan resin greatly decreased in comparison with the integral values of the protons at the third and fourth positions of the furan ring, the formation of a new carbon-carbon bond at the fifth position of the furan ring was confirmed. The measurement results of the FT-IR spectrum of the product furan resin are shown in FIG. 8.

From the results described above, the formation of the intended furan resin was confirmed.

<Measurement Conditions>
[GPS Measurement]

A GPC system manufactured by Shimadzu Corporation with columns "TSKgel G2000HXL"×2 (exclusion limit molecular weight: 10,000) was used. The column temperature was set at 40° C., and the flow rate was set at 1.0 ml/min. Tetrahydrofuran was used as developer solvent, and an RI was used as detector.

In the method for calculating a molecular weight, a calibration curve was made using standard polystyrenes "TSK standard POLYSTYLENE" having weight average molecular weights (Mw) of 18,100, 10,200, 5,970, 2,630, 1,050 and 453, respectively. The weight average molecular weight (Mw), the number average molecular weight (Mn), and the molecular weight distribution were obtained by calculation.

[Measurement of $^1$H-NMR Spectrum]

Using an NMR measurement apparatus "ECX-400" manufactured by JEOL limited, the measurement was performed at 23° C. in a solvent of deuterated DMSO. The $^1$H-NMR spectra measured using deuterated DMSO as solvent are shown in FIGS. 5 to 7.

[FT-IR Measurement]

The measurement was performed by an ATR method using "NICOLET 380" manufactured by Thermo Electron as spectrometer.

Example 9

To 5.0 g of the furan resin obtained in Example 8, 0.05 g of 65 mass % paratoluene sulfonic acid monohydrate aqueous solution was added as curing catalyst and mixed to prepare a thermosetting furan resin composition.

Subsequently, a Teflon sheet was closely attached with a formwork made of a resin with a width of 10 mm, a length of 80 mm, and a depth of 1 mm, and the thermosetting furan resin composition obtained was poured onto the Teflon sheet. A Teflon sheet was then put on the thermosetting furan resin composition. The whole was heat-treated in an oven at 60° C. for 1 hour, and then to 90° C. for 3 hours, for curing to obtain a cured product. The cured product was dark reddish brown and had high strength with flexibility.

Comparative Example 4

Except that no furan compound (10a) was used as raw material monomer, a reaction was performed in the same manner as in Example 8 and a dark brown liquid resin was obtained. The GPC measurement of the liquid resin obtained under the conditions described above resulted in a number average molecular weight (Mn) of 350, a weight average molecular weight (Mw) of 1,580, and a molecular weight distribution (Mw/Mn) of 4.51.

Comparative Example 5

A cured product was made from the resin in Comparative Example 4 in the same manner as in Example 9. The cured product obtained was blackish brown, and was fragile and not flexible, though having high hardness in comparison with the cured product obtained in Example 9.

The invention claimed is:

1. A furan resin comprising a repeating unit represented by the following general formula (1):

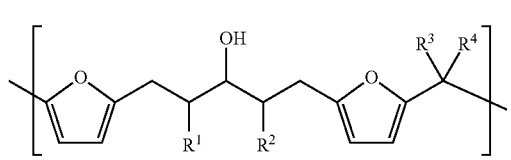
(1)

wherein $R^1$, $R^2$, $R^3$ and $R^4$ each independently represent a hydrogen atom, or an organic group having 1 to 8 carbon atoms which may contain a hetero atom in the formula (1); and $R^1$ and $R^2$, and $R^3$ and $R^4$ may be connected to each other to form a cyclic structure.

2. The furan resin according to claim 1, wherein the resin comprises a repeating unit represented by the following general formula (1) and a repeating unit represented by the following general formula (2):

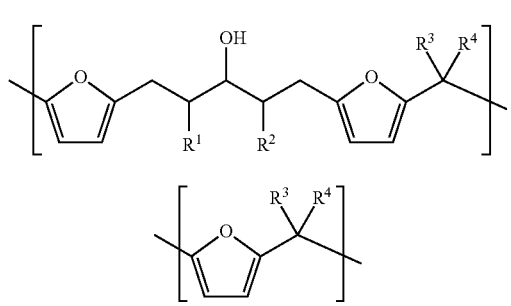

wherein $R^1$, $R^2$, $R^3$, $R^4$, $R^5$ and $R^6$ each independently represent a hydrogen atom, or an organic group having 1 to 8 carbon atoms which may contain a hetero atom in the formulas (1) and (2); and $R^1$ and $R^2$, $R^3$ and $R^4$, and $R^5$ and $R^6$ may be connected to each other to form a cyclic structure.

3. The furan resin according to claim 1, wherein $R^1$, $R^2$, $R^3$ and $R^4$ in the general formula (1) each represent a hydrogen atom.

4. The furan resin according to claim 2, wherein $R^1$, $R^2$, $R^3$, $R^4$, $R^5$ and $R^6$ in the general formulas (1) and (2) each represent a hydrogen atom.

5. A method for producing the furan resin according to claim 1, comprising reacting a furan compound represented by the following general formula (3) and a carbonyl compound represented by the following general formula (4) in the presence of an acid catalyst:

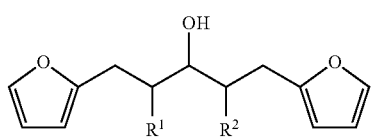
(3)

(4)

wherein $R^1$, $R^2$, $R^3$ and $R^4$ in the formulas (3) and (4) are equivalent to $R^1$, $R^2$, $R^3$ and $R^4$, respectively, in the formula (1).

6. A method for producing the furan resin according to claim 2, comprising reacting a furan compound represented by the following general formula (3), a carbonyl compound represented by the following general formula (4), and a furan compound represented by the following general formula (5) in the presence of an acid catalyst:

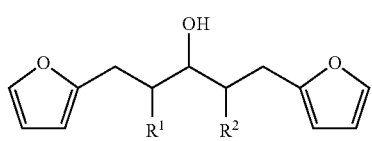
(3)

(4)

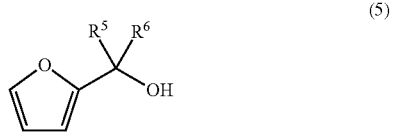
(5)

wherein $R^1$, $R^2$, $R^3$, $R^4$, $R^5$ and $R^6$ in the formulas (3), (4) and (5) are equivalent to $R^1$, $R^2$, $R^3$, $R^4$, $R^5$ and $R^6$, respectively, in the formulas (1) and (2).

7. A thermosetting furan resin composition comprising the furan resin according to claim 1 and at least one of a curing catalyst and a curing agent.

8. A cured product of the thermosetting furan resin composition according to claim 7.

9. A furan resin composite comprising the cured product according to claim 8 and a fibrous substrate.

10. A furan resin composite produced by impregnating a fibrous substrate with the thermosetting furan resin composition according to claim 7 and then curing the resin composition.

* * * * *